US011019603B2

(12) United States Patent
Pathak et al.

(10) Patent No.: US 11,019,603 B2
(45) Date of Patent: May 25, 2021

(54) CHANNEL SELECTION CONSTRAINTS IN A NETWORK HAVING MULTIPLE ACCESS POINTS

(71) Applicant: QUALCOMM Incorporated, San Diego, CA (US)

(72) Inventors: Ajay Kumar Pathak, Fremont, CA (US); Srinivas Katar, Fremont, CA (US); Xiaolong Huang, San Jose, CA (US); Kapil Rai, Sunnyvale, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 25 days.

(21) Appl. No.: 15/960,297

(22) Filed: Apr. 23, 2018

(65) Prior Publication Data

US 2018/0310279 A1  Oct. 25, 2018

Related U.S. Application Data

(60) Provisional application No. 62/489,917, filed on Apr. 25, 2017.

(51) Int. Cl.
*H04W 72/02* (2009.01)
*H04W 16/10* (2009.01)
(Continued)

(52) U.S. Cl.
CPC ........... *H04W 72/02* (2013.01); *H04W 16/02* (2013.01); *H04W 16/10* (2013.01); *H04W 24/02* (2013.01);
(Continued)

(58) Field of Classification Search
CPC ..... H04W 16/02; H04W 16/10; H04W 16/14; H04W 16/20; H04W 24/02; H04W 84/12;
(Continued)

(56) References Cited

U.S. PATENT DOCUMENTS 6,591,108 B1    7/2003  Herrig
2011/0183698 A1*  7/2011  Hoctor .............. H04W 72/1252
                                                      455/509

(Continued)

OTHER PUBLICATIONS

"PCT Application No. PCT/US2018/029203 International Search Report and Written Opinion", dated Aug. 1, 2018, 17 pages.

*Primary Examiner* — Peter Chen
(74) *Attorney, Agent, or Firm* — DeLizio Law, PLLC

(57) ABSTRACT

This disclosure provides systems, methods, and apparatus, including computer programs encoded on computer-readable media, for communicating channel selection constraints in a network having multiple access points (APs). In one aspect, a root AP may assist with channel selection (assignment) for the multiple APs. A first AP can provide channel operating constraints to the root AP to indicate one or more operating constraints for a particular channel that may be used by the first AP. The operating constraints may be based, at least in part, on a hardware characteristic of the first AP. For example, an operating constraint may indicate a minimum channel separation or a maximum transmit power to consider when the particular channel is used concurrently with another channel. In another aspect, the first AP can communicate a channel selection error and error code when a particular channel cannot be used due to an operating constraint.

25 Claims, 10 Drawing Sheets

(51) Int. Cl.
  *H04W 24/02* (2009.01)
  *H04W 16/02* (2009.01)
  *H04W 16/20* (2009.01)
  *H04W 16/14* (2009.01)
  *H04W 84/12* (2009.01)
  *H04W 72/08* (2009.01)

(52) U.S. Cl.
  CPC ............ *H04W 16/14* (2013.01); *H04W 16/20* (2013.01); *H04W 72/082* (2013.01); *H04W 84/12* (2013.01)

(58) Field of Classification Search
  CPC ... H04W 84/18; H04W 72/02; H04W 72/082; H04W 72/0453
  See application file for complete search history.

(56) References Cited

U.S. PATENT DOCUMENTS

| | | | |
|---|---|---|---|
| 2011/0205921 A1* | 8/2011 | Hsu | H04L 43/0829 370/252 |
| 2014/0341158 A1 | 11/2014 | Farricker | |
| 2015/0078298 A1 | 3/2015 | Barriac et al. | |
| 2015/0215950 A1 | 7/2015 | Amini et al. | |
| 2016/0066204 A1* | 3/2016 | Khawer | H04W 72/085 455/500 |
| 2016/0227416 A1* | 8/2016 | Suzuki | H04W 72/0453 |

* cited by examiner

300

310 — GENERATE, AT THE FIRST AP, A FIRST LIST OF CHANNELS THAT ARE AVAILABLE FOR USE BY THE FIRST AP

320 — DETERMINE ONE OR MORE OPERATING CONSTRAINTS FOR AT LEAST A FIRST CHANNEL IN THE FIRST LIST OF CHANNELS

330 — TRANSMIT A CHANNEL SELECTION INFORMATION MESSAGE TO A ROOT AP OF THE NETWORK, THE CHANNEL SELECTION INFORMATION MESSAGE INCLUDING THE FIRST LIST OF CHANNELS AND THE ONE OR MORE OPERATING CONSTRAINTS FOR AT LEAST THE FIRST CHANNEL

340 — RECEIVE, FROM THE ROOT AP, A CHANNEL SELECTION INDICATING AT LEAST ONE SELECTED CHANNEL FROM AMONG THE FIRST LIST OF CHANNELS, WHEREIN THE CHANNEL SELECTION IS BASED, AT LEAST IN PART, ON THE ONE OR MORE OPERATING CONSTRAINTS

350 — UTILIZE, BY THE FIRST AP, THE AT LEAST ONE SELECTED CHANNEL FOR PROVIDING A FIRST WIRELESS COVERAGE AREA

```
MESSAGE TYPE = CHANNEL SELECTION INFORMATION WITH CHANNEL
CONSTRAINTS
{
    LENGTH (VARIABLE);
    INTERFACE (MAC ADDRESS OF INTERFACE);
    PROTOCOL INDICATOR;
    RATE REQUIREMENT;
    RSSI TOLERANCE PARAMETERS;
    QUANTITY OF OPERABLE CHANNELS (K);
    FOR EACH K
    {
        CHANNEL NUMBER;
        BANDWIDTH PARAMETER;
        CHANNEL SEPARATION PARAMETER;
        OTHER CHANNEL CONSIDERATION/LIMITATION(S)
        OTHER HARDWARE CONSIDERATION/LIMITATION(S)
    }
}
```

720

```
MESSAGE TYPE = CHANNEL SELECTION INFORMATION WITH CHANNEL AND
POWER CONSTRAINTS
{
    LENGTH (VARIABLE);
    INTERFACE (MAC ADDRESS OF INTERFACE);
    PROTOCOL INDICATOR;
    RATE REQUIREMENT;
    RSSI TOLERANCE PARAMETERS;
    QUANTITY OF OPERABLE CHANNELS (K);
    FOR EACH K
    {
        CHANNEL NUMBER;
        BANDWIDTH PARAMETER;
        QUANTITY OF POTENTIAL TX POWER LEVELS (P);
        FOR EACH P
        {
            TX POWER LEVEL;
            CHANNEL SEPARATION PARAMETER;
        }
    }
}
```

```
MESSAGE TYPE = CHANNEL SELECTION ERROR
{
        LENGTH (VARIABLE);
        INTERFACE (MAC ADDRESS OF INTERFACE);
        QUANTITY OF NON-OPERABLE CHANNELS (N);
        FOR EACH N
        {
                CHANNEL NUMBER;
                ERROR CODE;
                QUANTITY OF ALTERNATIVE CHANNELS (R);
                FOR EACH R
                {
                        CHANNEL NUMBER;
                        CHANNEL SEPARATION PARAMETER;
                        TX POWER LEVEL(S);
                }
        }
}
```

910 — RECEIVE A CHANNEL SELECTION INFORMATION MESSAGE FROM A FIRST AP OF THE NETWORK, THE CHANNEL SELECTION INFORMATION MESSAGE INCLUDING A FIRST LIST OF CHANNELS AVAILABLE FOR USE BY THE FIRST AP AND ONE OR MORE OPERATING CONSTRAINTS ASSOCIATED WITH THE FIRST AP

920 — SELECT AT LEAST A FIRST SELECTED CHANNEL FROM AMONG THE FIRST LIST OF CHANNELS BASED, AT LEAST IN PART, ON THE ONE OR MORE OPERATING CONSTRAINTS

930 — PROVIDE AN INDICATION OF THE FIRST SELECTED CHANNEL TO THE FIRST AP

FIG. 9

CHANNEL SELECTION CONSTRAINTS IN A NETWORK HAVING MULTIPLE ACCESS POINTS

CROSS-REFERENCE TO RELATED APPLICATIONS

This Patent Application claims priority to U.S. Provisional Patent Application No. 62/489,917, filed Apr. 25, 2017 entitled "CHANNEL SELECTION CONSTRAINTS IN A NETWORK HAVING MULTIPLE ACCESS POINTS," and assigned to the assignee hereof. The disclosure of the prior Application is considered part of and is incorporated by reference in this Patent Application.

TECHNICAL FIELD

This disclosure relates to the field of network communication, and more particularly to channel selection in a network having multiple access points.

DESCRIPTION OF THE RELATED TECHNOLOGY

Wireless communication technologies can support wireless network access for a device via an access point (AP). An AP may be communicatively coupled to a gateway (such as a cable modem, fiber optic network device, a digital subscriber line (DSL) modem, or the like) to access a broadband network. The AP may provide a wireless network coverage area for one or more devices to access the broadband network via the AP. A network may include multiple APs capable of providing wireless network access. For example, first AP could be communicatively coupled to the broadband network, and a second AP can wirelessly connect to the first AP while extending the wireless network coverage area of the network. The second AP may operate similar to the first AP by receiving, buffering, and then relaying data to and from the first AP and a device that is wirelessly associated with the second AP. It is possible to combine multiple APs such that each AP is in communication with at least one other AP to provide a larger wireless coverage area with network access to the broadband network. The wireless coverage area provided by an AP may utilize a 2.4 GHz frequency band, a 5 GHz frequency band, or in both the 2.4 GHz frequency band and the 5 GHz frequency band. Within each frequency band, there may be different channels which an AP may utilize for the coverage area. Furthermore, overlapping coverage and multiple network topologies may provide various options (of AP, frequency band, or channel) for providing wireless service to a device in the network.

When a network includes multiple APs, the traditional techniques for managing channel selection (or allocation), load balancing, and network topology may be inadequate. It is desirable to optimize coverage area and service for devices utilizing the network, while taking into account the operating characteristics of particular APs. An enhanced channel selection technique may improve overall network performance for the network using multiple APs.

SUMMARY

The systems, methods, and devices of this disclosure each have several innovative aspects, no single one of which is solely responsible for the desirable attributes disclosed herein.

One innovative aspect of the subject matter described in this disclosure can be implemented by a first access point (AP) of a network. The first AP may have a processor and memory. The memory may store instructions which, when executed by the processor, cause the first AP to perform the operations described in this disclosure. The instructions may cause the first AP to generate, at the first AP, a first list of channels that are available for use by the first AP. The instructions may cause the first AP to determine one or more operating constraints for at least a first channel in the first list of channels. The instructions may cause the first AP to transmit a channel preference report message to a Multi-AP Controller of the network. The channel preference report message may include the first list of channels and the one or more operating constraints for at least the first channel.

In some implementations, the one or more operating constraints may include a radio operation restriction that is based, at least in part, on a minimum frequency separation between the first channel and another channel to be concurrently utilized by the first AP.

In some implementations, the one or more operating constraints may include a hardware characteristic of the first AP. one or more other channels which cannot be concurrently utilized by the first AP when the first channel is used, or one or more transmit (TX) power levels that can be used with the first channel. In some implementations, the one or more operating constraints may indicate a maximum quantity of overlapping basic service set (OBSS) channel utilizations that can be used with the first channel, a maximum quantity of APs that can concurrently utilize the first channel, or a maximum interference power that the first AP can tolerate when utilizing the first channel.

In some implementations, the one or more operating constraints may include a listing of potential TX power levels that can be used with the first channel, and for each of the potential TX power levels, a minimum channel separation between the first channel at the potential TX power level and another channel to be concurrently utilized by the first AP.

In some implementations, the instructions may cause the first AP to determine one or more service parameters associated with the first AP. The one or more service parameters may include at least one of a rate requirement and a received signal strength indicator tolerance. The instructions may cause the first AP to include the one or more service parameters in the channel preference report message prior to transmitting the channel preference report message to the Multi-AP Controller.

In some implementations, the instructions may cause the first AP to receive, from the Multi-AP Controller, a channel selection request message indicating at least one selected channel from among the first list of channels. The selected channel may be based, at least in part, on the one or more operating constraints.

In some implementations, the channel selection request message may indicate a maximum allowed TX power setting for the first AP to utilize with the at least one selected channel.

In some implementations, the channel selection request message may further indicate a first subchannel associated with the at least one selected channel.

In some implementations, the instructions to receive the channel selection request message include instructions which, when executed by the processor, further cause the first AP to receive, from the Multi-AP Controller, a second list of channels, the second list of channels having a subset of the first list of channels selected by the Multi-AP Controller. The second list of channels may include the at least one selected channel based, at least in part, on the one or more operating constraints.

In some implementations, the second list of channels may include the subset of the first list of channels selected by the Multi-AP Controller based, at least in part, on a channel contention avoidance technique at the Multi-AP Controller. Th channel contention avoidance technique may take into account the one or more operating constraints of the first AP.

In some implementations, the channel selection request message may indicate a bandwidth setting for the at least one selected channel.

In some implementations, the instructions may cause the first AP to determine that the at least one selected channel cannot be utilized by the first AP based, at least in part, on the one or more operating constraints. The instructions may cause the first AP to transmit a channel selection response message to the Multi-AP Controller, the channel selection response message indicating that the at least one selected channel cannot be utilized by the first AP.

In some implementations, the channel selection response message may include an error code indicative of a reason why the at least one selected channel cannot be utilized by the first AP.

In some implementations, the error code may indicate an insufficient channel separation between the at least one selected channel and another channel utilized by the first AP, a violation of a dynamic frequency selection (DFS) frequency avoidance policy, or a radio hardware limitation of the first AP.

In some implementations, the channel selection response message may include at least one alternative channel that is available for the first AP to utilize instead of the at least one selected channel.

Another innovative aspect of the subject matter described in this disclosure can be implemented by a Multi-AP Controller of a network. The Multi-AP Controller may have a processor and memory. The memory may store instructions which, when executed by the processor, cause the Multi-AP Controller to perform the operations described in this disclosure. The instructions may cause the Multi-AP Controller to receive a channel preference report message from a first AP of the network, the channel preference report message including a first list of channels available for use by the first AP and one or more operating constraints associated with the first AP. The instructions may cause the Multi-AP Controller to select at least a first selected channel from among the first list of channels based, at least in part, on the one or more operating constraints. The instructions may cause the Multi-AP Controller to provide an indication of the first selected channel to the first AP.

In some implementations, the instructions may cause the Multi-AP Controller to select, from among the first list of channels, a second selected channel for the first AP to utilize concurrently with the first selected channel. The one or more operating constraints may indicate a minimum frequency separation associated with the first selected channel. The second selected channel may be selected such that the second selected channel does not violate the minimum frequency separation associated with the first selected channel.

In some implementations, the instructions to select the at least the first selected channel may include instructions which, when executed by the processor, cause the Multi-AP Controller to determine a second list of channels, the second list of channels having a subset of the first list of channels selected by the root APMulti-AP Controller, wherein the second list of channels includes at least the first selected channel based, at least in part, on the one or more operating constraints.

In some implementations, the instructions to select the at least the first selected channel may include instructions which, when executed by the processor, cause the Multi-AP Controller to, for at least one candidate channel from the first list of channels, use a contention graph coloring technique to estimate the impact to the network that would result from the first AP selecting the candidate channel. The contention graph coloring technique may avoid channel assignments that would violate the one or more constraints.

In some implementations, the indication of the first selected channel may further indicate a first subchannel associated with the first selected channel.

In some implementations, the instructions, when executed by the processor, may further cause the Multi-AP Controller to receive a channel selection response message from the first AP, the channel selection response message indicating that the first selected channel cannot be utilized by the first AP.

In some implementations, the channel selection response message may include an error code indicative of a reason why the first selected channel cannot be utilized by the first AP.

In some implementations, the instructions, when executed by the processor, may further cause the Multi-AP Controller to select a second selected channel from among the first list of channels. The second selected channel may be selected based, at least in part, on the one or more operating constraints and the channel selection response message. The instructions may cause the Multi-AP Controller to provide an indication of the second selected channel to the first AP for the first AP to utilize instead of the first selected channel.

Another innovative aspect of the subject matter described in this disclosure can be implemented as a method performed by a first AP of a network. The method may include generating, at the first AP, a first list of channels that are available for use by the first AP, determining one or more operating constraints for at least a first channel in the first list of channels, and transmitting a channel preference report message to a Multi-AP Controller of the network, the channel preference report message including the first list of channels and the one or more operating constraints for at least the first channel.

In some implementations, the one or more operating constraints may include a radio operation restriction that is based, at least in part, on a minimum frequency separation between the first channel and another channel to be concurrently utilized by the first AP.

In some implementations, the method may include receiving, from the Multi-AP Controller, a channel selection request message indicating at least one selected channel from among the first list of channels, wherein the at least one selected channel is based, at least in part, on the one or more operating constraints.

In some implementations, the channel selection request message may indicate a maximum allowed TX power setting for the first AP to utilize with the at least one selected channel.

Another innovative aspect of the subject matter described in this disclosure can be implemented as a computer-readable medium having stored therein instructions which, when executed by a processor of a first AP for use in a network, cause the first AP to perform the operations described in this disclosure. The instructions may cause the first AP to generate, at the first AP, a first list of channels that are available for use by the first AP, determine one or more operating constraints for at least a first channel in the first list of channels, and transmit a channel preference report message to a Multi-AP Controller of the network, the channel preference report message including the first list of channels and the one or more operating constraints for at least the first channel.

In some implementations, the one or more operating constraints may include a radio operation restriction that is based, at least in part, on a minimum frequency separation between the first channel and another channel to be concurrently utilized by the first AP.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 3 depicts a flowchart with example operations for a first AP to communicate channel selection constraints.

FIG. 7 depicts two example message formats of a message for sharing channel operating constraints.

FIG. 8 depicts an example message format of a message for indicating a channel selection error.

FIG. 9 depicts a flowchart with example operations for a root AP to assist with channel selection using channel operating constraints.

Like reference numbers and designations in the various drawings indicate like elements.

DETAILED DESCRIPTION

Figure 1:
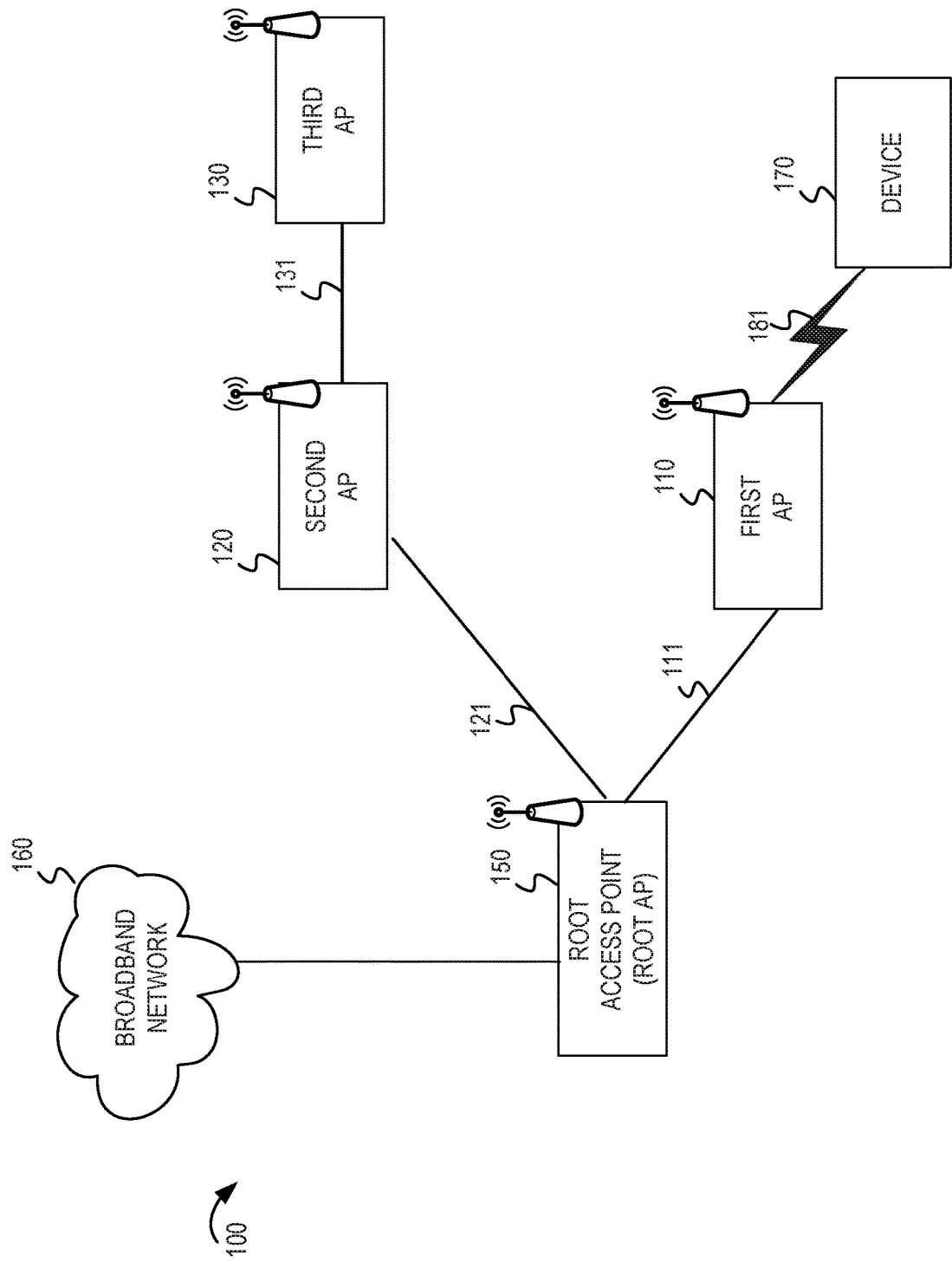
FIG. 1 depicts a system diagram of an example network with multiple access points (APs).

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless local area network (WLAN) communication according to the Institute of Electrical and Electronics Engineers (IEEE) 802.11 wireless standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In this disclosure, a network may be referred to as a wireless local area network (WLAN) when the network includes one or more access points (APs). The WLAN may provide access to a broadband network. For example, a gateway device, such as a central access point (CAP) or router, may provide access to the broadband network. The gateway device can couple to the broadband network through a cable, a fiber optic, a powerline, or DSL network connection. Devices in a network can establish a wireless association (also referred to as a wireless link, wireless connection, or the like) with an AP to access the broadband network via the gateway device. An AP may provide a wireless coverage area for devices to access the WLAN via a wireless channel. In some implementations, a network (such as a local area network in a home, apartment, business, or another area) may include multiple APs. Each AP may have different hardware capabilities (such as 2.4 GHz, 5 GHz support, dual-band single radio, dual band dual concurrent radios (DBDC), or the like) that may provide different options for wireless coverage. Typically, each AP utilizes one or more channels within a frequency band. A channel may refer to a frequency (or range) used by the AP to communicate with devices that have a wireless association with the AP. Similarly, the devices utilize the channel to communicate (via a wireless association) with the AP. The IEEE 802.11 standards may define a Basic Service Set (BSS) as one antenna (or group of antennas) of the AP, the wireless channel configuration, and all devices (such as STAs) that are associated with a particular channel. In some implementations, an AP may be equipped with more than one radio and may be capable of operating on more than one channel (such as a DBDC device). Each radio, channel, and associated STAs may be considered a separate BSS. The flexibility in configuring APs (frequency band, channel, and topology) in a network has resulted in new technologies to optimize the configurations of APs in the network. For example, APs may coordinate with one another or a centralized resource to support automated configuration, optimization, and management of overlapping BSSs in a network (such as a self-organizing network, SON). In some networks, APs may autonomously configure (or reconfigure) a BSS based on information gathered by the AP.

Channel selection refers to a mechanism for an AP to select a channel for a BSS in a wireless coverage area. In this document, a channel selection may refer to an initial channel selection (when first introducing an AP into a network) or a channel reselection (when updating or switching channels used by an existing AP in the network). In some implementations, channel selection may include selection of a frequency band in addition to the channel within the frequency band. In one example, each AP in a network may dynamically select an optimal channel for the AP. In various implementations, channel selection may be done with or without centralized oversight (such as a Multi-AP Controller of the network). In some implementations, one of the APs may be referred to as a root AP, while other APs make path/routing selection using a logical topology between each of the other APs and the root AP. The root AP also may be a Multi-AP Controller of the network. A Multi-AP Controller is a logical entity that implements logic for controlling the operation of a network having multiple APs. A Multi-AP controller may or may not provide a wireless coverage area itself. For brevity, some examples of this description refer to a root AP (or RAP) which serves as the Multi-AP Controller and also provides wireless coverage. However, in some implementations, a Multi-AP Controller may not provide wireless connectivity and may be communicatively coupled to one or more APs in the network. The Multi-AP Controller may implement protocols for communicating with one or more APs in the network to manage wireless channel selection. The channel may be selected from a set of channels within the frequency bands supported by the AP. In a network having multiple APs, some APs may create overlapping wireless coverage areas using different channels. It may be possible for multiple APs to use the same channel in overlapping wireless coverage areas using channel reuse. Channel reuse refers to the ability for a first and second AP to utilize the same channel when the co-channel interference between the first and second AP is sufficiently low. For example, channel reuse allows both the first and second AP to utilize the channel with acceptable amounts co-channel interference.

Some channel selection techniques may rely on channel conditions that are observed or reported by another AP. A channel selection technique may consider the signal strengths of nearby APs. In some implementations, a root AP (or Multi-AP Controller) may participate in a channel selection technique and manage which channel(s) could be used by other APs in the network. The root AP may be able to select (or assign, delegate, instruct) which channels to be used by a first AP by considering the overall network, overlapping areas, information from various APs, etc. To improve the channel selection, the root AP would benefit from knowing about channel operating constraints that may be associated with a particular AP using a particular channel. A channel operating constraint (which also may be referred to as a "radio operation restriction") may indicate a restriction that applies to a particular channel at an AP. The channel operating constraint may be based on a hardware characteristic of the first AP. For example, the hardware characteristic may introduce limitations or other factors that impact the use of particular channels. In some implementations, a hardware characteristic may include a component performance limitation, a system architecture limitation, a performance limitation, or other feature of the first AP which limits the use of concurrent channels at the first AP. In one example, the channel operating constraints may describe a minimum channel separation (which also may be referred to as a minimum frequency separation or bandwidth separation) that should be between two channels implemented at the first AP. For example, if the first AP utilizes a first channel on a first radio of the first AP, there may be a channel operating constraint that the first AP cannot utilize another channel on a second radio of the first AP that is less than the minimum channel separation away from the first channel. The channel operating constraints may be specific to particular channel(s) that are available for use by the first AP.

In accordance with this disclosure, a first AP can communicate a channel operating constraint to another AP, the root AP, or a Multi-AP Controller. The channel operating constraint may be used during a channel selection. For example, a Multi-AP Controller (or root AP) may allocate channels to various APs such that the allocation would not violate the channel operating constraints of the APs. In one aspect of this disclosure, the channel operating constraints also may describe the minimum channel separation (away from the first channel) in terms of the transmit (TX) power level utilized by the first AP for the first channel. For example, the first AP may be capable of utilizing different TX power levels for the first channel, and the channel operating constraints (of minimum channel separation) may be different depending on the TX power level used. The TX power level may be included in a message with channel operating constraints that is sent to another AP, root AP, or Multi-AP Controller. The other AP, root AP, or Multi-AP Controller may consider the TX power level indicated by each AP to allocate channels and maximum TX power levels to various APs in the network.

In one aspect of this disclosure, a first AP can receive a selected channel (or list of selected channels) in a channel selection request message from the root AP (or Multi-AP Controller). If the selected channel(s) cannot be used by the first AP, the first AP can communicate a channel selection error message. The channel selection error message may be referred to as a "channel selection response message" that is in response to the channel selection request message. The channel selection response message may include a reason code to indicate why the channel selection cannot be used, and may include one or more alternative channels for the root AP (or Multi-AP Controller) to consider for a subsequent channel selection.

Particular implementations of the subject matter described in this disclosure can be implemented to realize one or more of the following potential advantages. Coordinating channel selection between a first AP and a root AP (or Multi-AP Controller) may maximize the network capacity from a local perspective (of the first AP) as well as a global view (of the root AP or Multi-AP Controller) for channel selection in the network. Thus, the overall capacity and performance of the network may be optimized. By sharing channel operating constraints, the first AP can improve the channel selection technique to account for hardware characteristics of the first AP. In a network having a mix of APs from different vendors, the channel selection information message may provide a consistent mechanism for sharing hardware-specific limitations between the APs. Furthermore, the ability to transmit a channel selection error message may improve the reselection of a new operating channel when a previously selected channel cannot be implemented due to a hardware-associated limitation of the first AP.

FIG. 1 depicts a system diagram of an example network with multiple access points (APs). The network 100 includes a root access point (root AP, or RAP) 150 that serves as a Multi-AP Controller for the network 100. In FIG. 1, the RAP 150 also provides access to a broadband network 160. For example, the RAP 150 may be a central access point or router which is communicatively coupled to the broadband network 160. The root AP 150 may be separate or co-located with a gateway device (not shown). A gateway device, such as a modem or router, may provide access to the broadband network 160. For example, the gateway device can couple to the broadband network through a cable, a fiber optic, a powerline, or DSL network connection. The network also includes multiple APs, including a first a first AP 110, a second AP 120, and a third AP 130. Devices in the network can establish a wireless association (also referred to as a wireless link, wireless connection, or the like) with an AP to access the broadband network via the gateway device. For example, the wireless association may be in accordance with an association protocol associated with the wireless coverage area of the AP. In some implementations (as shown in FIG. 1), the root AP 150 is independent and separate from the multiple APs. In other implementations, one of the multiple APs may be collocated with the root AP 150 or may be part of the same apparatus. In this disclosure, the term AP refers to any device that provides wireless access to a network, including access points and range extenders.

The first AP 110 may have a backhaul channel 111 to the root AP 150. The second AP 120 may have a backhaul channel 121 to the root AP 150. The third AP 130 may have a backhaul channel 131 to the second AP 120. In this arrangement, the third AP 130 may be referred to as a child AP of the second AP 120. Similarly, the second AP 120 and first AP 110 may be referred to as child APs of the root AP 150. A child AP (also referred to as a satellite AP, or SAP) is any access point that receives network access to the broadband network 160 via one or more upstream APs. For example, as shown in FIG. 1, the third AP 130 obtains access to the broadband network 160 via the second AP 120 and root AP 150. A child AP will utilize a backhaul channel to access an upstream AP. The backhaul channels 111, 121, 131 may be wired, wireless, or a combination of wireless and wired links.

Each of the multiple APs may be associated with a wireless coverage area (not shown). The wireless coverage areas may overlap, and a device 170 may be within the wireless coverage area of more than one AP. The network 100 includes a device 170 (such as a laptop, a computer, a sensor, a camera, a thermostat, a mobile station, a wireless device, a smartphone, or the like) that is initially associated (shown as wireless association 181) with the first AP 110. In the example in FIG. 1, the device 170 may be a wireless station (STA). In other examples, the device 170 may be a child AP that has wireless associations with other STAs. Although FIG. 1 depicts one device (device 170) accessing a wireless channel utilized by the APs 110, 120, and 130, other devices may be present.

In some implementations, the APs 110, 120, and 130 can be configured as a dual-band, dual concurrent (DBDC) wireless device. A DBDC device can include two transceivers (which also may be referred to as radios) and can operate on two different frequency bands independently and simultaneously. For example, a first transceiver can operate in the 2.4 GHz frequency band and a second transceiver can operate in the 5 GHz frequency band. The two transceivers can be linked within the DBDC device such that data can be communicated between the transceivers. When using DBDC devices, additional considerations (regarding coexisting transceivers) may impact channel selection. Furthermore, in some implementations, a network (such as a hybrid network) can support both wired and wireless communication technologies, multiple wired communication technologies, or multiple wireless communication technologies. For example, the root AP or the APs 110, 120, and 130 may support both IEEE 802.11 and powerline communication protocols. In other examples, the root AP or the APs 110, 120, and 130 may support a combination of IEEE 802.11 and powerline communication protocols, a combination of IEEE 802.11 and coaxial cable (Coax) based communication protocols, a combination of long-term evolution (LTE) and IEEE 802.11 communication protocols, a combination of IEEE 802.11 and Bluetooth communication protocols, and various other suitable combinations. Thus, the network data pathways in the hybrid network can include wired and wireless communication technologies. In some implementations, the root AP 150 and the APs 110, 120, and 130 can comply with other wireless specifications, such as a ZigBee® specification, or a cellular radio specification or any other technically feasible wireless protocol. The link between the root AP 150 and the broadband network 160 can be referred to as a broadband link. The broadband link can provide at least a portion of a data pathway to another network (such as a communication service provider network, the Internet, or the like). The broadband link of the root AP 150 can be a wireless, a wired (such as through an Ethernet or powerline connection), or a hybrid link. The channel selection in this disclosure can be used with DBDC wireless devices similarly as with non-DBDC wireless devices. Each of the root AP 150 and the APs 110, 120, and 130 may use the channel selection to select more than one channel to be used for more than one transceiver, respectively. The channel selection may be performed iteratively or concurrently (by replicating the techniques in this disclosure) for an AP that supports more than one channel (such as a DBDC device).

Channel selection (or reselection) may be distributed, centralized, or a combination of distributed and centralized. In this disclosure, regardless of where the channel selection is performed, the channel selection can be modified based on one or more channel operating constraints of another AP. For example, a hardware limitation (such as a transmitter power circuitry, signal processor capability, minimum channel separation, or the like) of a first AP may prevent the first AP from utilizing a first channel and a second channel concurrently. The hardware characteristic also may limit how much TX power could be used on a particular channel for a particular bandwidth setting (on that channel). In this disclosure, a channel selection information message can inform another AP regarding any distinct considerations for a first AP. Because there may be different vendors for various APs in the network, a root AP (or Multi-AP Controller) may not be aware of the channel operating constraints. Rather than assume that the first AP shares the same channel operating constraints (or other channel assignment considerations) of the root AP, the root AP can obtain the channel operating constraints for the first AP using the channel selection information message (which also may be referred to as a "Channel Preference Report message"). In accordance with this disclosure, the enhanced channel selection technique may be performed using coordination among multiple APs or between an AP and a root AP (Multi-AP Controller). The enhanced channel selection technique may improve the overall performance of the network by taking into account the channel operating constraints (including radio operating restrictions) of different APs in the network.

Figure 2:
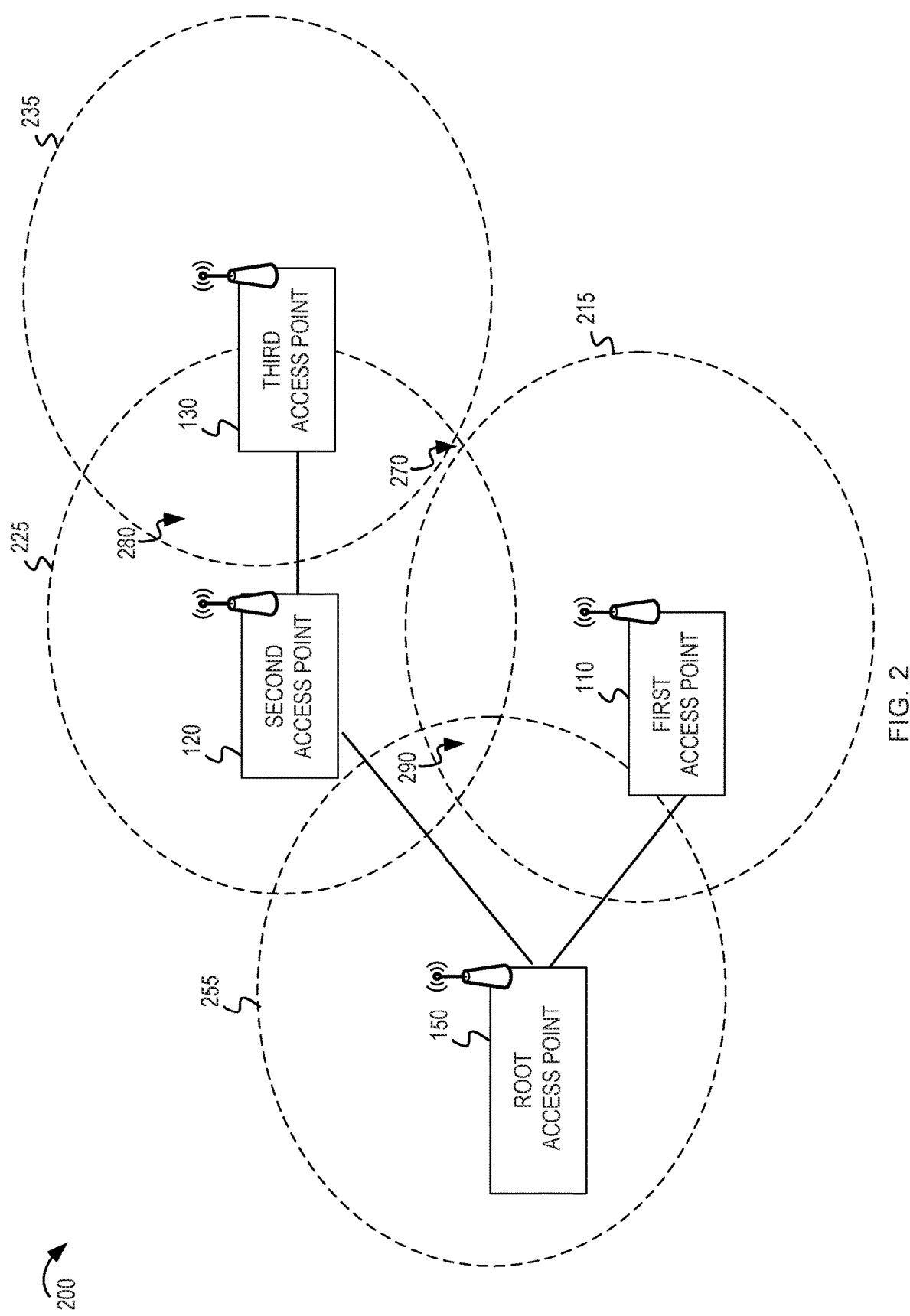
FIG. 2 depicts another system diagram showing wireless coverage areas of the multiple APs.

FIG. 2 depicts a system diagram of the example network and another example network change operation of channel selection. The network 200 is similar to network 100 described in FIG. 1. However, because FIG. 2 is related to channel selection, the device 170 and broadband network 160 are omitted from network 200 for brevity. Each of the APs 110, 120, and 130 (and the root AP 150 serving as a Multi-AP Controller) may provide a wireless coverage area. A wireless coverage area refers to a physical area in which an AP can transmit and receive signals on a channel. An AP may not provide uniform coverage within an environment. As the wireless signals propagate further from the AP, wireless signal strength decreases. The wireless coverage may be a factor of the signal power, device capabilities, AP capabilities, frequency propagation, materials, or radio frequency (RF) interference. Therefore, a wireless coverage area may not be a precise distance from an AP. Furthermore, different channels may be associated with different wireless coverage areas based on the environment or other APs in the network. Therefore, enhanced channel selection may result in an optimal channel for maximizing the combined coverage areas of multiple APs in the network.

When a network includes multiple APs, it is desirable for nearby APs avoid using the same channel. For example, co-channel interference may occur between two APs that are transmitting and receiving on the same channel. Co-channel interference can severely affect the performance of a wireless network. Therefore, a traditional AP may select and use a channel that is not currently in use by a nearby AP. However, there may be a limited quantity of channels within a frequency band due to spectrum constraints. In a network having multiple APs, some APs may create overlapping wireless coverage areas using different channels. Furthermore, some APs may use the same channels using channel reuse. Channel reuse refers to the ability for a first and second AP to utilize the same channel when the co-channel interference between the first and second AP is sufficiently low. For example, channel reuse allows both the first and second AP to utilize the channel with acceptable amounts co-channel interference. However, without coordination (or stability control techniques), an AP may perform a channel selection that adversely impacts another AP. In some networks, the channel selection may cause a chain reaction causing multiple APs to reselect new channels.

Shown in FIG. 2, the root AP 150 may provide a root wireless coverage area 255, the first AP 110 may provide a first wireless coverage area 215, the second AP 120 may provide a second wireless coverage area 225, and the third AP 130 may provide a third wireless coverage area 235. The wireless coverage areas may overlap. For example, the second wireless coverage area 225 and third wireless coverage area 235 are shown with an overlapping coverage area at 280. Ideally, a different channel would be used for the second wireless coverage area 225 than a channel used for the third wireless coverage area 235. By selecting different channels for overlapping coverage areas, the effective channel capacity for each of the different channels is not affected (or minimally affected) by the overlapping coverage area.

Shown at 270, there may be non-overlapping coverage areas (such as the first wireless coverage area 215 and third wireless coverage area 235) in the vicinity of overlapping coverage areas (such as the second wireless coverage area 225 and the third wireless coverage area 235). In another example, at 290, there are three overlapping coverage areas (the root wireless coverage area 255, the first wireless coverage area 215, and the second wireless coverage area 225). In an optimal channel selection technique, there would be no channel reuse for overlapping coverage areas. However, sometimes it is unavoidable to reuse a same channel for an overlapping coverage area. For example, when multiple APs in the network operate in proximity to each other. Furthermore, it may be desirable for some homes, apartments, buildings, or other environments to utilize many APs to provide wireless coverage throughout the environment.

Each AP may be capable of scanning for a set of channels within a frequency band. However, without considering the impact of channel selection with respect to other APs, a channel selection at one AP may inadvertently impact another AP. For example, using a traditional channel selection technique, the first AP 110 may select a channel for first wireless coverage area 215 based on what the first AP 110 can observe (such as root wireless coverage area 255). However, the first AP 110 may inadvertently select a channel that impacts the second wireless coverage area 225 or the third wireless coverage area 235 (possibly unbeknownst to the first AP 110). For example, a channel selected by the first AP 110 may appear to be unutilized (or underutilized) in a wireless scan performed by the first AP 110. However, the same channel may appear to be heavily loaded (or significant interference) at the second AP 120 (possibly from a different network that is also operating within a coverage area of the second AP 120). The second AP 120 can be impacted in multiple ways depending on how it is utilizing its radios. For example, if the second AP 120 is using that channel for a backhaul channel from the second AP 120 to the first AP 110, then the second AP 120 may see higher packet errors for the backhaul channel due to a neighboring interferer that is unseen by the first AP 110. In another example, if the second AP 120 is using the channel for both backhaul and BSS service links, then the second AP 120 also may be constrained in the amount of traffic it can serve in its BSS (since the second AP 120 would be contending with the neighbor AP, even though the neighbor AP is unseen by the first AP 110).

Thus, by coordinating channel selection between the first AP 110 and the root AP 150, the root AP 150 may select a better channel to maximize channel reuse within the network, such as when overlapping coverage areas are unavoidable. Maximizing channel reuse may improve the overall network capacity. In some implementations, the root AP 150 may determine a channel selection using channel selection information from the first AP 110. The channel selection information can include channel operating constraints for the root AP 150 to consider when determining the channel selection.

FIG. 3 depicts a flowchart with example operations for a first AP to communicate channel selection constraints. The flowchart 300 begins at block 310. At block 310, the first AP may generate, at the first AP, a first list of channels that are available for use by the first AP. The first AP may obtain channel condition information regarding a set of channels available for use by the first AP. The first AP may determine the first list of channels from among the set of channels. The first list of channels may be selected by the first AP based, at least in part, on the channel condition information and the one or more operating constraints. For example, the first AP may scan a set of channels to obtain all of the channel condition information that can be observed by scanning the channels. Alternatively, or additionally, the first AP may use any combination of techniques to obtain the channel condition information, including: scanning the set of channels to detect the channel condition information, querying at least a second AP in the network to request the channel condition information, and requesting (from the root AP or Multi-AP Controller) consolidated channel condition information regarding one or more other APs in the network.

The first AP may rank the set of channels based, at least in part, on the channel condition information, and select the first list of channels from the ranking. In some implementations, the first list of channels may be determined by comparing an effective channel capacity for each candidate channel. Other considerations may be used by the first AP. For example, the first AP may consider an estimated load impact to a neighbor AP that is already using the candidate channel or a probability of triggering a remote channel switch trigger condition of the neighbor AP that would result from the first AP selecting the candidate channel. In some implementations, the first AP may generate a score for each candidate channel based on the effective channel capacity, estimated load impact, or a probability of triggering a remote channel switch trigger condition. The scores for a plurality of candidate channels may be used to rank or order the candidate channels. In some implementations, the first list of channels includes the higher ranked channels from the plurality of candidate channels (such as a number n of the highest ranked channels).

In some implementations, the channel selection also may be used to determine a channel size within a frequency band that supports different channel sizes. For example, the first AP may be capable of utilizing either of a 20 MHz, 40 MHz, 80 MHz, or another channel size within a frequency band (such as the 5.0 GHz frequency band defined in the IEEE 802.11 standards). The first list of channels may include a ranked (in order of preference) listing of channels even though the channels in the list may be of different channel sizes.

At block 320, the first AP may determine one or more operating constraints for at least a first channel in the first list of channels. For example, the one or more operating constraints may be based, at least in part, on a hardware characteristic of the first AP. For example, the first AP may determine potential TX power levels that could be used for each channel. The first AP may determine what channel separation (or frequency separation or bandwidth separation) should be used for a combination of a particular channel and particular TX power level. In some implementations, the minimum frequency separation may be expressed in multiples of 10 MHz. The channel operating constraints may indicate a channel number and a minimum frequency separation that the AP would impose when operating a first radio on that channel number. The minimum frequency separation may represent a frequency distance (in terms of MHz) between the center frequency of that channel and the center operating frequency of another radio (operating simultaneous TX/RX) of the AP.

At block 330, the first AP may transmit a channel selection information message (which also may be referred to as a "Channel Preference Report message") to a root AP of the network. The channel selection information message may include the first list of channels (which also may be referred to as a channel preference list) and the one or more operating constraints (which also may be referred to as radio operation restrictions) for at least the first channel. For example, the first AP may transmit the channel selection information message via the network. The channel selection information message is usable by the root AP to determine a channel selection indicating at least a first selected channel from among the first list of channels. The channel selection may be based, at least in part, on the one or more operating constraints.

At block 340, the first AP also may receive, from the root AP, a channel selection indicating at least a first selected channel from among the first list of channels. The channel selection may be based, at least in part, on the one or more operating constraints. For example, the channel selection may be in the form of a channel selection request message from the root AP, indicating a selected channel (or second list of channels). The second list of channels may be a subset of the first list of channels which has been selected by the root AP. The second list may include the first selected channel which has been selected by the root AP based, at least in part, on the one or more operating constraints. In some implementations, the channel selection reqeust message from the root AP also may include a TX power limit for the first selected channel specified by the root AP.

At block 350, the first AP may utilize the first selected channel for providing a first wireless coverage area. In some implementations, where the root AP provides a second list of channels for consideration by the first AP, the first AP may select, from the second list of channels, a new channel and switch the wireless coverage area of the first AP to the new channel. The first AP may configure the BSS to utilize the new channel.

Figure 4:
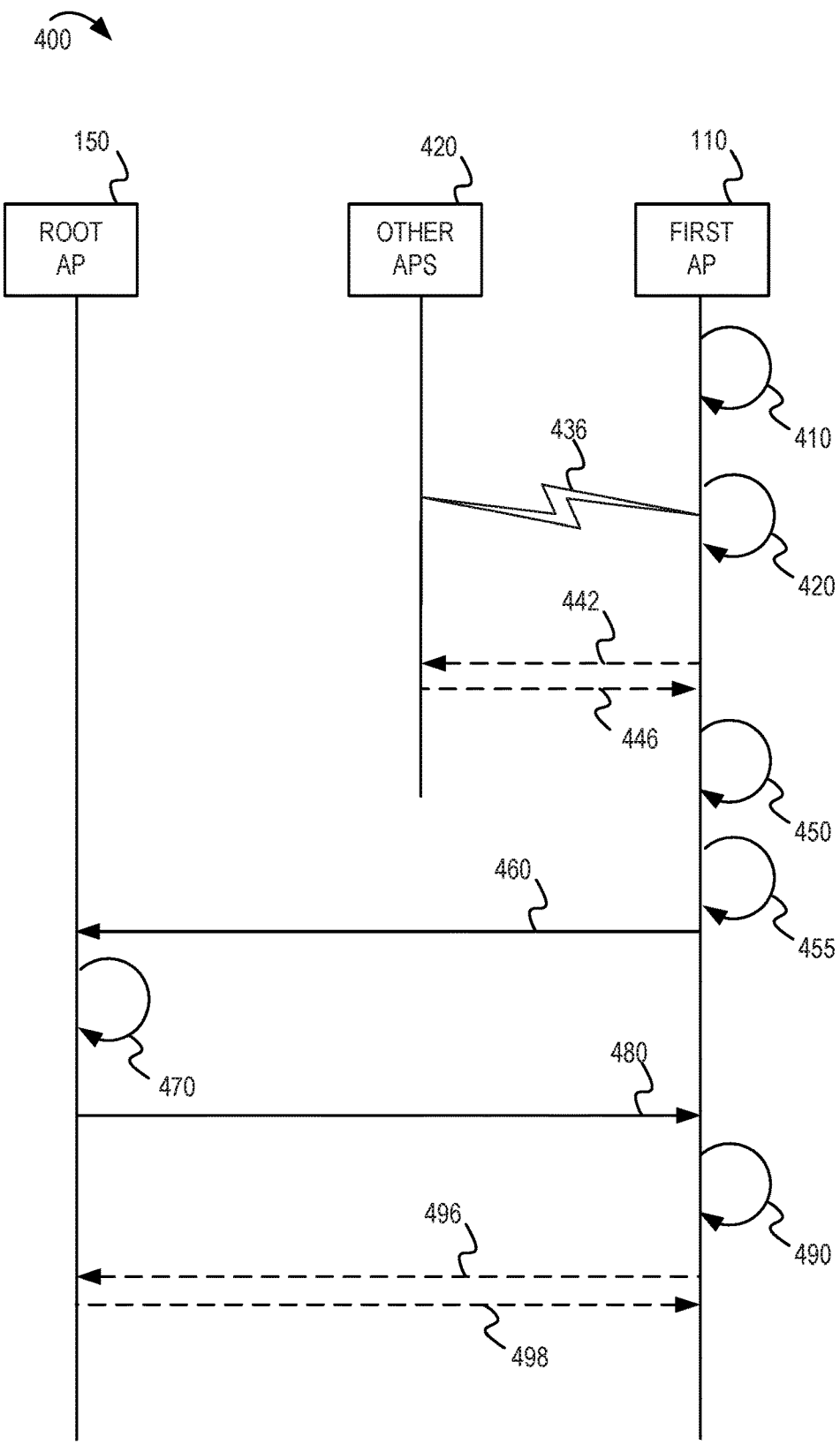
FIG. 4 depicts a message flow diagram of an example implementation of channel selection with channel operating constraints.

FIG. 4 depicts a message flow diagram of example implementation of channel selection with channel operating constraints. The message flow diagram 400 describes messages between the first AP 110 and root AP 150. At 410, the first AP 110 may detect a local channel switch trigger condition. A channel switch trigger condition may be any condition which triggers the first AP 110 to perform a channel evaluation for the channel selection. For example, the first AP 110 may receive a channel switch trigger message from the root AP or another AP in the network. In another example, the local channel switch trigger condition may be a locally (at the first AP) initiated channel evaluation. In some implementations, the local channel switch trigger condition may be previously configured by the root AP 150. For example, the root AP 150 may transmit parameters (such as conditions or thresholds) to be used by the first AP 110 for the local channel switch trigger condition.

Examples of a local channel switch trigger condition may include:
  determining a deterioration of the channel condition for a current channel used by the first AP
  determining that the first AP has a load higher than a trigger threshold
  determining co-channel interference on a current channel being used by the first AP, where the co-channel interference is impacting channel availability for one or more stations associated with the current channel
  comparing an interference power level with a threshold level
  comparing a current time with a trigger time configured at the first AP At 420, the first AP 110 may scan (shown as 436) the set of channels to obtain whatever channel condition information can be observed by scanning the channels. Scanning may include observing signals from other devices or other APs 420 that may be using the channels. Scanning may be used to determine channel signal strength, current utilization of the channel, or any combination of channel characteristics.

In addition to scanning, the first AP 110 also may query one or more other APs 420. For example, the first AP 110 may transmit a query message (shown at 442) to the other AP(s) 420 to obtain channel condition information from the other AP(s) 420. The other AP(s) 420 may transmit a response message (shown at 446) to the first AP 110. The response message may describe one or more other channels observed by the other AP(s) 420, but which the other AP(s) 420 is not currently using. For example, the other AP(s) 420 may include channel condition information that it has obtained by performing a channel scan at the other AP(s) 420. By soliciting channel condition information from another AP (and particularly from a neighboring AP), the first AP 110 can collect a more complete view of the network. As described below, the first AP 110 can utilize the channel condition information obtained from multiple APs to enhance a channel selection technique at the first AP 110.

At 450, the first AP 110 may determine a first list of channels using a first selection technique at the first AP 110. For example, the first AP 110 may determine the first list of channels based on ranking an effective channel capacity for each channel. The effective channel capacity may be estimated using parameters such as the available airtime of a channel, overlapping BSS airtime, number of devices in the overlapping BSS, signal strength, interference power level, and the physical data rate for devices of the first AP's BSS. The first list of channels may be selected in consideration of a load impact on the other APs 420 if the first AP chooses a channel being used by the other APs 420. In another example, the probability of triggering a neighbor AP to switch channels may be considered when selecting the first list of channels (described further in FIG. 5).

In some implementations, the first AP 110 may consider a candidate channel that is already utilized by one or more neighbor APs. For example, a BSS of a neighbor AP may be considered an overlapping BSS (OBSS) if a least part of the coverage area for the neighbor AP is overlapping the coverage area of the first AP 110. The first AP 110 may determine the effective channel capacity as an estimate of how much of the OBSS airtime the first AP 110 may be expected to utilize via normal airtime contention procedures. To determine the effective channel capacity for the candidate channel, the first AP 110 may determine a current available airtime of the candidate channel utilized by the OBSS, determine an additional contention airtime of the candidate channel based, at least in part, on a quantity of stations associated with the first AP and the current available airtime (utilized by the OBSS); determine an estimated physical layer transmission data rate for the quantity of stations associated with the first AP; and calculate the effective channel capacity based, at least in part, on the current available airtime, the additional contention airtime, and the estimated physical layer transmission rate.

At 455, the first AP 110 may determine, for at least a first channel in the first list of channels, one or more operating constraints. For example, the one or more operating constraints may be based, at least in part, on a hardware characteristic of the first AP. The first AP 110 may determine a plurality of channel operating constraints corresponding to a plurality of channels. Examples of the channel operating constraints are further described in relation to FIG. 7.

At 460, the first AP 110 transmits a channel selection information message to the root AP 150. The channel selection information message may include the first list of channels as well as the one or more operating constraints that may be associated with a first channel of the first list of channels. Thus, in accordance with this disclosure, the message at 460 may communicate channel operating constraints. For example, in addition to a first list of channels (indicating preferred channels), the message at 460 also may include a list of constrained channels (indicating blocked channels that the first AP 110 should not use concurrently with a particular channel). The list of constrained channels may include channels (or channel sizes within a frequency band) that should be avoided by the first AP 110. The channel constraints may include operating constraints based on a hardware characteristic (or limitation) of the first AP 110. The channel constraints may be specific to particular channels (or channel sizes) available for use by the first AP 110.

In some implementations, the message at 460 may include a listing of concurrent channels that are being used by the first AP 110. For example, if the first AP 110 is capable of operating on more than one channel (such as a DBDC device, or a device with more than one transceiver), the listing of concurrent channels may inform the root AP 150 of the other channels being utilized by the first AP 110.

In some implementations, the first AP 110 also may inform the root AP 150 of the data rate the first AP 110 needs to support (for example, based on client devices or child STAs) and a threshold received signal strength indicator (RSSI) the first AP 110 will tolerate while utilizing a channel. These parameters may describe the spatial footprint of a BSS at the first AP 110. The root AP 150 may take these parameters into account when allocating channels (such as in a crowded environment). For example, the root AP 150 may determine a spatial mapping of the APs in the network and use the channel selection information from a plurality of APs to determine spatial footprints for various channel options at nearby APs. Doing so may assist the root AP in minimizing overlapping coverage areas while maximizing spatial coverage for the overall network. Techniques for allocating channels based on spatial footprint may allow two APs to reuse channels as much as possible while avoiding overlapping footprints.

At 470, the root AP 150 may distil the first list of channels to determine a first selected channel (or a second list of channels, which is a subset of the first list of channels). For example, the root AP 150 can reduce/revise the first list of channels based on the root AP's global consideration of the network. In some implementations, the root AP 150 can compare the first list of channels to its assessment of best channel allocation based on channel condition information collected by the root AP 150. The root AP 150 also may consider the channel reuse opportunities in the network. For example, the root AP 150 may use a contention graph coloring technique to allocate channels so as to maximize channel reuse while using the preferred channels recommended by each of the APs in the network. Examples of the contention graph coloring technique may include maximizing channel reuse based on a logical topology of the network, a physical topology of the network, one or more channel operating constraints for various channels at various APs in the network, or channel condition information from more than one AP in the network.

At 480, the root AP 150 transmits a channel selection request message that includes an indication of the first selected channel (or the second list of channels) to the first AP 110. In some implementations, the channel selection request message may include a list of constrained channels (also referred to as restricted channels) which the root AP 150 forbids or restricts the first AP 110 from selecting. In some implementations, the root AP 150 also may indicate a primary sub-channel for the first AP 110 to utilize. For example, by indicating the sub-channel, the root AP 150 can may reduce interference with another AP using the first selected channel on a different sub-channel. A subchannel refers to an offset from the center frequency associated with a channel. For example, if a first channel (channel "40") operates on a center frequency at 5200 MHz, a first sub-channel (channel "40−") may operate on a center frequency at 5199 MHz, and a second subchannel (channel "40+") may operate on a center frequency at 5201 Mhz. Using subchannels may increase capacity because overlapping coverage areas can use different subchannels rather than different channels. Similarly, the use of subchannels may reduce co-channel interference due to the slight frequency offset.

At 490, the first AP 110 may utilize the first selected channel for a wireless coverage area of the first AP 110. If the root AP 150 has provided a second list of channels (representing a list of alternative channels which are acceptable for the first AP 110 to utilize), the first AP 110 may select the first selected channel from the second list of channels. Optionally, at 496, the first AP 110 may transmit a message to the root AP 150 to indicate that the first AP is utilizing the first selected channel. At 498, the root AP 150 may transmit an acknowledge message to the first AP 110. The root AP 150 also may inform another AP (such as a neighbor AP of the first AP 110) about the channel selection of the first AP 110 (if the first AP 110 has not already done so).

Figure 5:
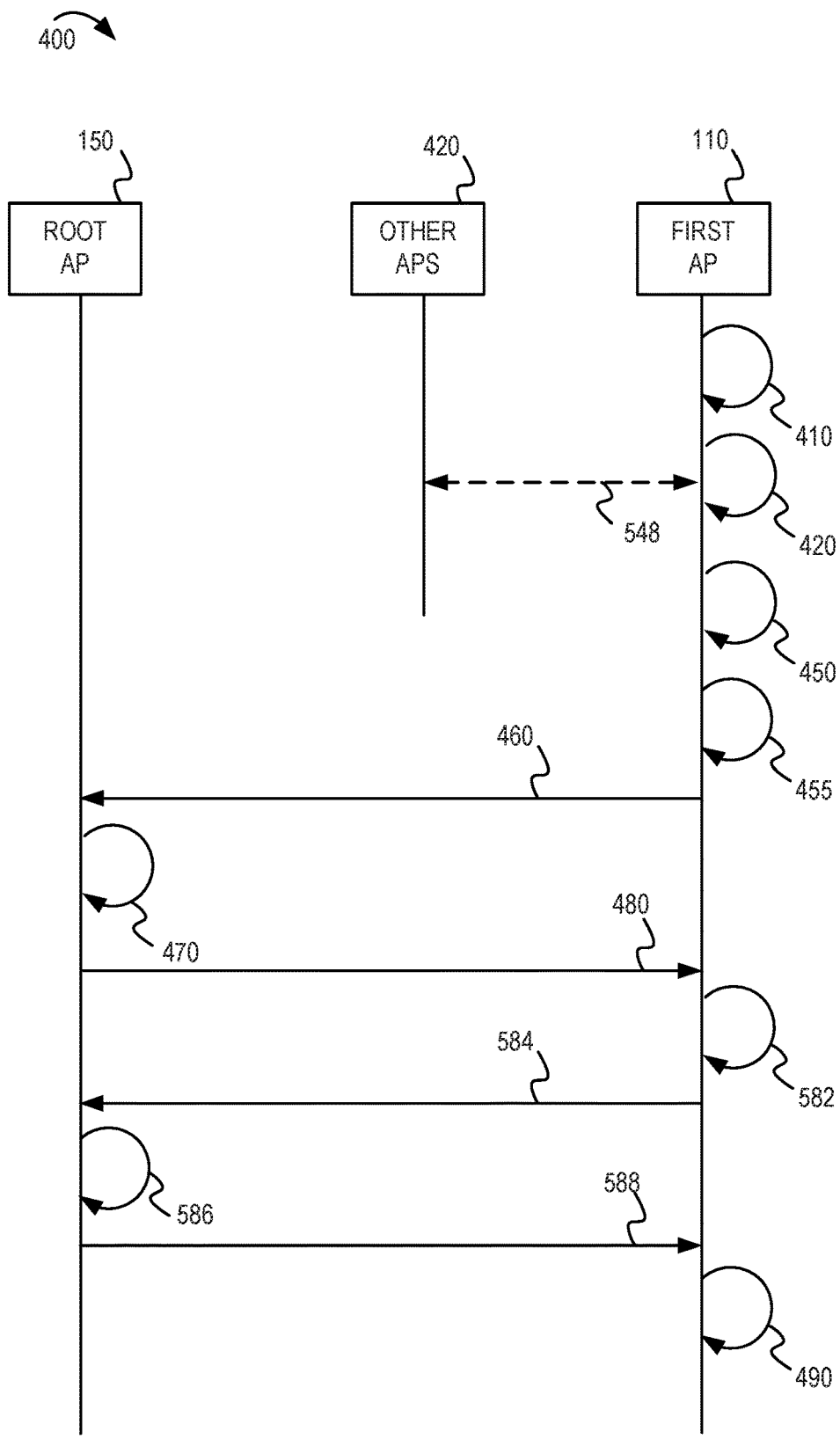
FIG. 5 depicts a message flow diagram of another example implementation of a channel selection resulting a channel selection error.

FIG. 5 depicts a message flow diagram of another example implementation of a channel selection resulting a channel selection error. The message flow diagram 500 includes similar messages and processes as those described in the message flow diagram 400 of FIG. 4. At 410, the first AP 110 may detect a local channel switch trigger condition. At 420, the first AP 110 may obtain whatever channel condition information can be observed by scanning the channels or by communicating with the other AP(s) 420 (shown at 548). At 450, the first AP 110 may determine a first list of channels using a first selection technique at the first AP 110. At 455, the first AP 110 may determine, for at least a first channel in the first list of channels, one or more operating constraints. At 460, the first AP 110 may transmit a channel selection information message to the root AP 150. At 470, the root AP 150 may distil the first list of channels to determine a first selected channel (or a second list of channels, which is a subset of the first list of channels). At 480, the root AP 150 may transmit a channel selection request message that includes an indication of the first selected channel (or the second list of channels) to the first AP 110. As described in FIG. 4, in some implementations, the root AP 150 also may transmit an indication of a first subchannel associated with the first selected channel.

Different from FIG. 4, the message flow diagram 500 includes a mechanism for the first AP 110 to determine that the first AP can not utilize the first selected channel (which may be referred to as a non-operable channel). For example, the hardware characteristic of the first AP may constrain the use of the first selected channel. In some implementations, the first selected channel cannot be used concurrently with another channel (or channel size) already implemented by the first AP (such as at a second transceiver of the first AP).

At 584, the first AP 110 may transmit a channel selection error message (which also may be referred to as a channel selection response message) to the root AP. For example, the channel selection error message may indicate that the first selected channel cannot be utilized by the first AP. In some implementations, the channel selection error message may include an error code (which also may be referred to as a reason code) indicating a reason why the first selected channel cannot be utilized by the first AP. In some implementations, the channel selection error message may include an indication of at least one alternative channel that is available for the first AP to utilize instead of the first selected channel. An example of the channel selection error message is further described in relation to FIG. 8.

At 586, the root AP 150 may process the channel selection error message and select a second selected channel (or revised second list of channels) for the first AP 110. For example, the second selected channel may be selected from among the first list of channels, taking into account the one or more operating constraints, as well as any information included in the channel selection error message.

At 588, the root AP 150 may transmit an indication of the second selected channel (or the revised second list of channels) to the first AP 110. At 490, the first AP 110 may utilize the second selected channel (or one of the channels in the revised second list of channels) for a wireless coverage area of the first AP 110.

Figure 6:
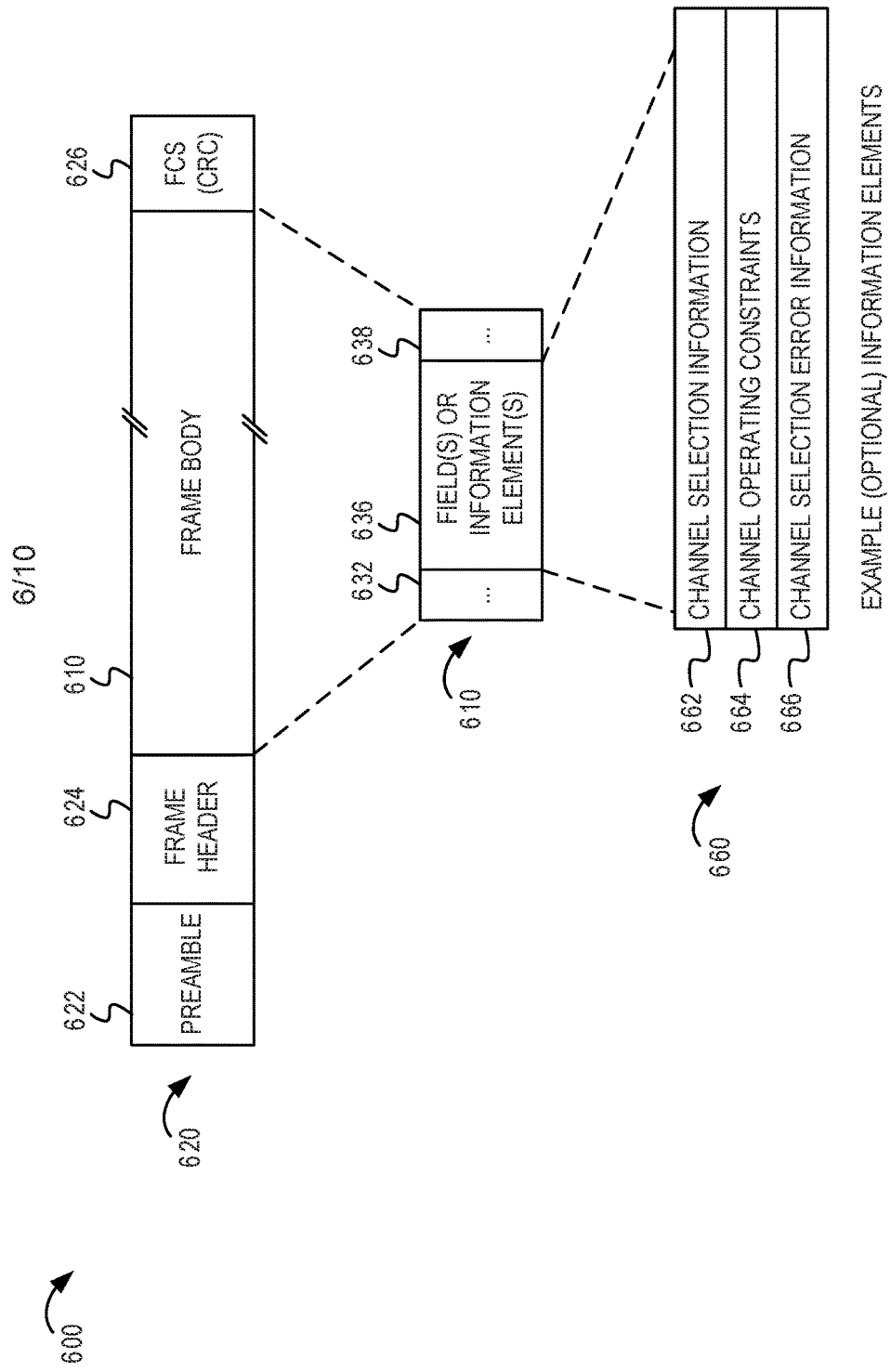
FIG. 6 depicts an example conceptual diagram of a message for sharing channel condition information.

FIG. 6 depicts an example conceptual diagram of a message for sharing channel condition information. For example, the message may be sent from one AP (including the root AP) to another AP. FIG. 6 includes an example data frame 620. The data frame 620 may include a preamble 622, a frame header 624, a frame body 610, and a frame check sequence (FCS) 626. The preamble 622 may include one or more bits to establish synchronization. The frame header 624 may include source and destination network addresses (such as the network address of the sending AP and receiving AP, respectively), the length of data frame, or other frame control information. The frame body 610 may be organized with a message format and may include a variety of fields or information elements 632, 636, and 638.

Various fields or information elements may be used to share channel conditions information regarding a described AP. Several examples of information elements 660 are illustrated in FIG. 6. For example, the information elements may include channel selection information 662 (such as channel utilization, number of STAs, contention statistics, channel availability, and the like) for one or more channels being used by (or available for use by) the described AP. The information elements may include channel operating constraints 664 (such as minimum channel separation, potential TX power levels, considerations regarding the concurrent use of two channels, or the like). The information elements may include channel selection error information 666 indicative of a channel that cannot be used by the AP (including an identifier of the unusable channel, error/reason code, alternative channels, or the like).

In some implementations, an AP may be equipped with more than one radio and may be capable of operating on more than one channel (such as a DBDC device). Each radio, channel, and associated STAs may be considered a separate BSS. In this situation, the AP may transmit multiple messages, or may transmit a single message having a collection of the above-described fields or information elements, to describe the multiple BSSs of the AP.

FIG. 7 depicts two example message formats of a message for sharing channel operating constraints. The example message formats are provided as non-limiting examples for the purpose of explaining different types of information that may be included in a channel selection information message. Some variations of the channel selection information message may include more or less of the fields described in this Figure.

A first example message format 710 may include channel operating constraints. The first example message format 710 includes the following fields and structure:

```
MESSAGE TYPE = CHANNEL SELECTION INFORMATION
WITH CHANNEL CONSTRAINTS
{
  LENGTH (VARIABLE);
  INTERFACE (MAC ADDRESS OF INTERFACE);
  PROTOCOL INDICATOR;
  RATE REQUIREMENT;
  RSSI TOLERANCE PARAMETERS;
  QUANTITY OF OPERABLE CHANNELS (K);
  FOR EACH K
  {
    CHANNEL NUMBER;
    BANDWIDTH PARAMETER;
    CHANNEL SEPARATION PARAMETER;
    OTHER CHANNEL CONSIDERATION/LIMITATION(S)
    OTHER HARDWARE CONSIDERATION/LIMITATION(S)
  }
}
```

The length value may be used to indicate the length of the channel selection information message. The interface value may indicate a media access control (MAC) address of the interface being described by the message. The protocol indicator value may indicate a protocol (such as "0000" for high throughput, HT, protocol; "0001" for very high throughput, VHT, protocol; "0010" for HE, and so on). The protocol also may be referred to as a mode, such as when an interface can operate using different protocols/modes. In some implementations, other information regarding the interface may be included in the message (such as to designate a multi-input-multi-output, MIMO, configuration, or the like).

In some implementations, the channel selection information message may include information regarding service requirements and/or tolerances associated with a BSS at the AP. For example, the first example message format 710 may include a rate requirement value and/or RSSI tolerance parameters. The rate requirement may indicate a data rate the first AP 110 needs to support (for example, based on client devices or child STAs). The RSSI tolerance parameters may indicate a threshold received signal strength indicator (RSSI) that the first AP 110 will tolerate while utilizing a channel.

The first example message format 710 includes a field to indicate the quantity of operable channels (designated as a number k). The operable channels may be a subset of a set of channels in a frequency band. For each operable channel (k), the first example message format 710 includes channel-specific information including channel operating constraints. The channel-specific information may include the channel number and a bandwidth parameter (for example, "0000" for indicating 20 MHz, "0001" for indicating 40 MHz, "0010" for indicating 80 MHz, and so on). The channel-specific information may include a channel separation parameter. For example, the channel separation parameter may indicate a bandwidth/frequency distance from the operating channel of another interface on this device that can have single band simultaneous TX/RX with this interface operating on this channel. In some implementations, the channel separation parameter may be described in 5 MHz or 10 MHz increments. In some implementations, the available channels are pre-determined in 5 MHz steps, and the channel separation parameter can indicate a number of 5 MHz channels to include between the currently-described channel and another channel.

The first example message format 710 may include other channel considerations/limitations or other hardware considerations/limitations. For example, the channel-specific information may identify one or more channels that cannot be operated concurrently with this channel on the same device. In some implementations, the channel-specific information may indicate a maximum OBSS channel utilizations on this channel. In some implementations, the channel-specific information may indicate a maximum number of simultaneously deployed APs on this channel. In some implementations, the channel-specific information may indicate a maximum interference power on this channel. Other channel-specific information may be readily conceived as being pertinent to a channel operating constraint, and could be included in the channel selection information message.

A second example message format 720 may include channel operating constraints as well as TX power constraints. The second example message format 720 includes the following fields and structure:

```
MESSAGE TYPE = CHANNEL SELECTION INFORMATION
WITH CHANNEL AND POWER CONSTRAINTS
{
```

-continued

```
  LENGTH (VARIABLE);
  INTERFACE (MAC ADDRESS OF INTERFACE);
  PROTOCOL INDICATOR;
  RATE REQUIREMENT;
  RSSI TOLERANCE PARAMETERS;
  QUANTITY OF OPERABLE CHANNELS (K);
  FOR EACH K
  {
    CHANNEL NUMBER;
    BANDWIDTH PARAMETER;
    QUANTITY OF POTENTIAL TX POWER LEVELS (P);
    FOR EACH P
    {
      TX POWER LEVEL;
      CHANNEL SEPARATION PARAMETER;
    }
  }
}
```

The second example message format 720 includes fields similar to those described in the first example message format 710. However, in the channel-specific information, the second example message format 720 further includes information about TX power levels (P) for each channel. For each potential TX power level of each operable channel, the channel-specific information may include an indicator of the potential TX power level and the channel separation parameter. For some implementations, the channel, TX power level, channel separation, and bandwidth parameter may together determine the wireless coverage area provided by the first AP in view of the radio operation capability of the first AP.

FIG. 8 depicts an example message format of a message for indicating a channel selection error. The example message format is provided as a non-limiting example for the purpose of explaining different types of information that may be included in a channel selection error message. Some variations of the channel selection error message may include more or less of the fields described in this Figure. The first example message format 810 includes the following fields and structure:

```
MESSAGE TYPE = CHANNEL SELECTION ERROR
{
  LENGTH (VARIABLE);
  INTERFACE (MAC ADDRESS OF INTERFACE);
  QUANTITY OF NON-OPERABLE CHANNELS (N);
  FOR EACH N
  {
    CHANNEL NUMBER;
    ERROR CODE;
    QUANTITY OF ALTERNATIVE CHANNELS (R);
    FOR EACH R
    {
      CHANNEL NUMBER;
      CHANNEL SEPARATION PARAMETER;
      TX POWER LEVEL(S);
    }
  }
}
```

The length value may be used to indicate the length of the channel selection error message. The interface value may indicate a media access control (MAC) address of the interface being described by the message. The first example message format 810 includes a field to indicate the quantity of non-operable channels (designated as a number n). For each non-operable channel (n), the first example message format 810 may include channel-specific information about the error. The channel-specific information may include the channel number and an error code. For example, the error code may include an indicator to indicate a reason that the channel is non-operable (such as "0000" for "insufficient bandwidth separation," "0001" for violating a dynamic frequency selection policy, or the like). Error codes could be specified for a variety of different hardware/radio limitations that prevent the AP from using the non-operable channel.

In some implementations, the channel-specific information may indicate one or more alternative channels that could be used instead of the non-operable channel. For example, the channel-specific information may indicate a quantity of alternative channels (designated as a number r). For each alternative channel (r), the channel-specific information may include a channel number, a channel separation parameter, and/or TX power level(s) for the alternative channel.

FIG. 9 depicts a flowchart with example operations for a root AP to assist with channel selection using channel operating constraints. The flowchart 900 begins at block 910. At block 910, the root AP may receive a channel selection information message from a first AP of the network. The channel selection information message may include a first list of channels available for use by the first AP and one or more operating constraints associated with the first AP. For example, the one or more operating constraints may be based, at least in part, on a hardware characteristic of the first AP.

At block 920, the root AP may select at least a first selected channel from among the first list of channels based, at least in part, on the one or more operating constraints. For example, the root AP may use a contention graph coloring technique to estimate the impact to the network that would result from the first AP utilizing a candidate channel of the first list of channels. The contention graph coloring technique may be used to avoid channel assignments that would violate the one or more constraints. In some implementations, the contention graph coloring technique also may maximize channel reuse in the network. In some implementations, the contention graph coloring technique also may take into consideration a logical topology of the network, a physical topology of the network, or channel condition information from more than one AP in the network.

At block 930, the root AP may provide an indication of the first selected channel to the first AP. In some implementation, the channel selection may include a second list of channels that is a subset (or reduced or revised) selection of channels from the first list of channels.

Figure 10:
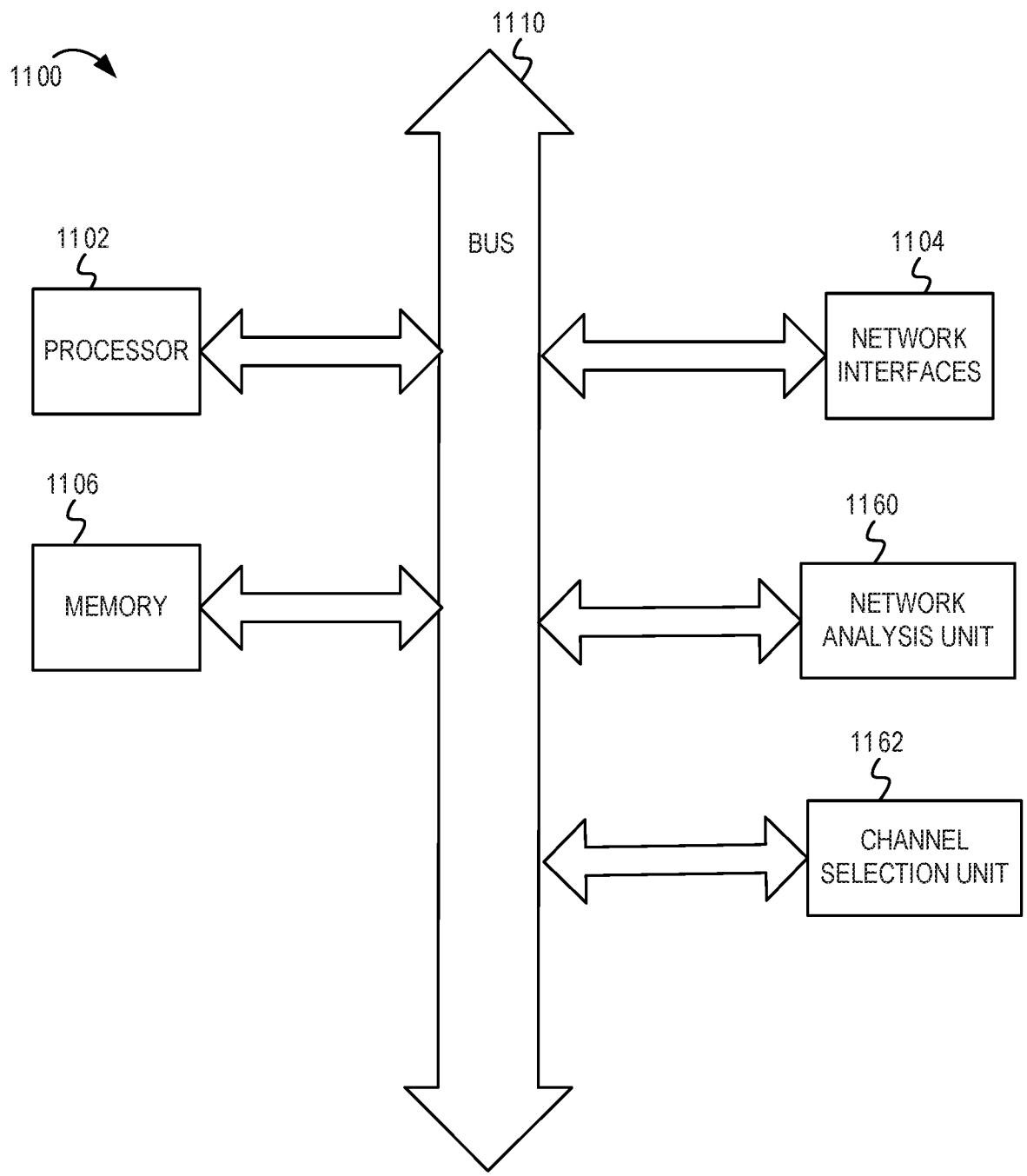
FIG. 10 shows a block diagram of an example electronic device for implementing aspects of this disclosure.

FIG. 10 shows a block diagram of an example electronic device for implementing aspects of this disclosure. In some implementations, the electronic device 1000 may be one of an access point (including any of the APs described herein), a range extender, or other electronic systems. The electronic device 1000 can include a processor unit 1002 (possibly including multiple processors, multiple cores, multiple nodes, or implementing multi-threading, etc.). The electronic device 1000 also may include a memory unit 1006. The memory unit 1006 may be system memory or any one or more of the below-described possible realizations of computer-readable media. The electronic device 1000 also may include a bus 1010 (such as PCI, ISA, PCI-Express, HyperTransport®, InfiniBand®, NuBus, AHB, AXI, or the like), and a network interface unit 1004 that can include at least one of a wireless network interface (such as a WLAN interface, a Bluetooth® interface, a WiMAX interface, a ZigBee® interface, a Wireless USB interface, or the like) and a wired network interface (such as an Ethernet interface, a powerline communication interface, or the like). In some implementations, the electronic device 1000 may support multiple network interfaces—each of which is configured to couple the electronic device 1000 to a different communication network.

The electronic device 1000 may include a network analysis unit 1060 and a channel selection unit 1062. In some implementations, the network analysis unit 1060 and the channel selection unit 1062, can be distributed within the processor unit 1002, the memory unit 1006, and the bus 1010. The network analysis unit 1060 and channel selection unit 1062 can perform some or all of the operations described in FIGS. 1-9 above. The network analysis unit 1060 can determine channel condition information regarding other APs in the network. The channel selection unit 1062 can communicate channel condition information or other channel selection information (including channel operating constraints) to another AP. The channel selection unit 1062 in another AP may perform a channel selection using the channel condition information or other channel selection information.

The memory unit 1006 can include computer instructions executable by the processor unit 1002 to implement the functionality of the implementations described in FIGS. 1-9 above. Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (such as video cards, audio cards, additional network interfaces, peripheral devices, or the like). The processor unit 1002, the memory unit 1006, the network interface unit 1004, and the network configurator unit 1008 are coupled to the bus 1010. Although illustrated as being coupled to the bus 1010, the memory unit 1006 may be coupled to the processor unit 1002.

FIGS. 1-10 and the operations described herein are examples meant to aid in understanding example implementations and should not be used to limit the potential implementations or limit scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An access point (AP) for use in a network, comprising:
a processor; and
memory having instructions stored therein which, when executed by the processor, cause the AP to:
generate a first list of channels that are available for use by the AP;
determine one or more operating constraints for at least a first channel in the first list of channels, the one or more operating constraints including
a listing of potential transmit (TX) power levels that are available for use with the first channel, and
for each potential TX power level, a channel separation parameter that indicates a minimum frequency separation between the first channel at the potential TX power level and a second channel to be concurrently utilized by the AP;
transmit a channel preference report message to a Multi-AP Controller of the network, the channel preference report message including the first list of channels and the one or more operating constraints for at least the first channel; and
receive, from the Multi-AP Controller, a channel selection request message indicating at least one selected channel from among the first list of channels, wherein the at least one selected channel is based, at least in part, on the one or more operating constraints.

2. The AP of claim 1, wherein the one or more operating constraints include at least one member selected from a group consisting of:
a hardware characteristic of the AP;
one or more other channels which cannot be concurrently utilized by the AP when the first channel is used;

a maximum quantity of overlapping basic service set (OBSS) channel utilizations that can be used with the first channel;

a maximum quantity of APs that can concurrently utilize the first channel; and a maximum interference power that the AP can tolerate when utilizing the first channel.

3. The AP of claim 1, wherein the instructions, when executed by the processor, further cause the AP to:

determine one or more service parameters associated with the AP, wherein the one or more service parameters includes at least one of a rate requirement and a received signal strength indicator tolerance, wherein the channel preference report message further includes the one or more service parameters.

4. The AP of claim 1, wherein the channel selection request message indicates a maximum allowed TX power setting for the AP to utilize with the at least one selected channel.

5. The AP of claim 1, wherein the channel selection request message further indicates a first subchannel associated with the at least one selected channel.

6. The AP of claim 1, wherein the instructions to receive the channel selection request message include instructions which, when executed by the processor, further cause the AP to:

receive, from the Multi-AP Controller, a second list of channels, the second list of channels having a subset of the first list of channels selected by the Multi-AP Controller, wherein the second list of channels includes the at least one selected channel based, at least in part, on the one or more operating constraints.

7. The AP of claim 6, wherein the second list of channels comprises the subset of the first list of channels selected by the Multi-AP Controller based, at least in part, on a channel contention avoidance technique at the Multi-AP Controller, wherein the channel contention avoidance technique takes into account the one or more operating constraints of the AP.

8. The AP of claim 1, wherein the channel selection request message indicates a bandwidth setting for the at least one selected channel.

9. The AP of claim 1, wherein the instructions, when executed by the processor, further cause the AP to:

determine, by the AP, that the at least one selected channel cannot be utilized by the AP based, at least in part, on the one or more operating constraints; and transmit a channel selection response message to the Multi-AP Controller, the channel selection response message indicating that the at least one selected channel cannot be utilized by the AP.

10. The AP of claim 9, wherein the channel selection response message includes an error code indicative of a reason why the at least one selected channel cannot be utilized by the AP.

11. The AP of claim 10, wherein the error code comprises at least one member of a group consisting of:

an insufficient channel separation between the at least one selected channel and another channel utilized by the AP;

a violation of a dynamic frequency selection (DFS) frequency avoidance policy; and a radio hardware limitation of the AP.

12. The AP of claim 11, wherein the channel selection response message includes at least one alternative channel that is available for the AP to utilize instead of the at least one selected channel.

13. The AP of claim 1, wherein the instructions, when executed by the processor, further cause the AP to:

determine channel condition information for a plurality of channels;

rank the plurality of channels based on the channel condition information; and select a quantity of highest ranked channels from the plurality of channels based on the rank, the first list of channels including the quantity of highest ranked channels.

14. The AP of claim 1, wherein the instructions, when executed by the processor, further cause the AP to:

generate a second list of channels that are unavailable for use by the AP, wherein the channel preference report message further includes the second list of channels that are unavailable for use by the AP.

15. A multiple access point (Multi-AP) Controller of a network, comprising:

a processor; and memory having instructions stored therein which, when executed by the processor, cause the Multi-AP Controller to:

receive a channel preference report message from an AP of the network, the channel preference report message including a first list of channels available for use by the AP and one or more operating constraints associated with the AP;

select at least a first channel from among the first list of channels based, at least in part, on the one or more operating constraints, the one or more operating constraints including a listing of potential transmit (TX) power levels that are available for use with the first channel, and for each potential TX power level, a channel separation parameter that indicates a minimum frequency separation between the first channel at the potential TX power level and a second channel to be concurrently utilized by the AP; and provide an indication of the first channel to the AP.

16. The Multi-AP Controller of claim 15, wherein the instructions, when executed by the processor, further cause the Multi-AP Controller to:

select, from among the first list of channels, the second channel for the AP to utilize concurrently with the first channel, wherein the second channel is selected such that the second channel does not violate the minimum frequency separation.

17. The Multi-AP Controller of claim 15, wherein the instructions to select the at least the first channel include instructions which, when executed by the processor, cause the Multi-AP Controller to determine a second list of channels, the second list of channels having a subset of the first list of channels selected by the Multi-AP Controller, wherein the second list of channels includes at least the first channel based, at least in part, on the one or more operating constraints.

18. The Multi-AP Controller of claim 15, wherein the instructions to select the at least the first channel include instructions which, when executed by the processor, cause the Multi-AP Controller to:

for at least one candidate channel from the first list of channels:

use a contention graph coloring technique to estimate an impact to the network that would result from the AP selecting the candidate channel, wherein the contention graph coloring technique avoids channel assignments that would violate the one or more operating constraints.

19. The Multi-AP Controller of claim 15, wherein the indication of the first channel further indicates a first sub-channel associated with the first channel.

20. The Multi-AP Controller of claim 15, wherein the instructions, when executed by the processor, further cause the Multi-AP Controller to:
receive a channel selection response message from the AP, the channel selection response message indicating that the first channel cannot be utilized by the AP.

21. The Multi-AP Controller of claim 20, wherein the channel selection response message includes an error code indicative of a reason why the first channel cannot be utilized by the AP.

22. The Multi-AP Controller of claim 20, wherein the instructions, when executed by the processor, further cause the Multi-AP Controller to:
select a third channel from among the first list of channels, wherein the third channel is selected based, at least in part, on the one or more operating constraints and the channel selection response message; and
provide an indication of the third channel to the AP for the AP to utilize instead of the first channel.

23. A method performed by an access point (AP) of a network, the method comprising:
generating, at the AP, a first list of channels that are available for use by the AP;
determining one or more operating constraints for at least a first channel in the first list of channels, the one or more operating constraints including
a listing of potential transmit (TX) power levels that are available for use with the first channel, and
for each potential TX power level, a channel separation parameter that indicates a minimum frequency separation between the first channel at the potential TX power level and a second channel to be concurrently utilized by the AP;
transmitting a channel preference report message to a Multi-AP Controller of the network, the channel preference report message including the first list of channels and the one or more operating constraints for at least the first channel; and
receiving, from the Multi-AP Controller, a channel selection request message indicating at least one selected channel from among the first list of channels, wherein the at least one selected channel is based, at least in part, on the one or more operating constraints.

24. The method of claim 23,
wherein the channel selection request message indicates a maximum allowed TX power setting for the AP to utilize with the at least one selected channel.

25. A non-transitory computer-readable medium having stored therein instructions which, when executed by a processor of an access point (AP) for use in a network, cause the AP to:
generate, at the AP, a first list of channels that are available for use by the AP;
determine one or more operating constraints for at least a first channel in the first list of channels, the one or more operating constraints including
a listing of potential transmit (TX) power levels that are available for use with the first channel, and
for each potential TX power level, a channel separation parameter that indicates a minimum frequency separation between the first channel at the potential TX power level and a second channel to be concurrently utilized by the AP;
transmit a channel preference report message to a Multi-AP Controller of the network, the channel preference report message including the first list of channels and the one or more operating constraints for at least the first channel; and
receive, from the Multi-AP Controller, a channel selection request message indicating at least one selected channel from among the first list of channels, wherein the at least one selected channel is based, at least in part, on the one or more operating constraints.

* * * * *